Oct. 29, 1968 J. J. RUGO 3,408,588
AUTOMATIC CONTROL SYSTEM UTILIZING BISTABLE VOLTAGE COMPARATOR
Filed Dec. 29, 1966

INVENTOR
J. J. RUGO
BY R. B. Andis
ATTORNEY

United States Patent Office 3,408,588

Patented Oct. 29, 1968

3,408,588

AUTOMATIC CONTROL SYSTEM UTILIZING BISTABLE VOLTAGE COMPARATOR

John J. Rugo, Middletown, N.J., assignor to Bell Telephone Laboratories, Incorporated, Murray Hill, N.J., a corporation of New York Filed Dec. 29, 1966, Ser. No. 605,792
6 Claims. (Cl. 330—29)

ABSTRACT OF THE DISCLOSURE

In an automatic control system for a periodic input signal a full-wave rectified sample of the output of the system is compared in a bistable voltage comparator to a predetermined threshold level, thereby generating a square wave which has an average value proportional to the amplitude of the sampled signal. The filtered square wave is then used as a control voltage to control and stabilize the amplitude of the output signal.

*Background of the invention*

This invention relates generally to automatic control systems and more specifically, although in its broader aspects not exclusively, to automatic gain control systems.

In automatic gain control systems the amplitude of the system's output signal is stabilized in response to an input signal that has a varying amplitude. In a typical application of an automatic gain control system the signal output of a high gain amplifier is first rectified and then directly filtered to derive a direct current control voltage which, in turn, is applied either to a variable loss or a variable gain device in the input to the amplifier to automatically control the amplitude of the output signal. The control voltage which is thereby generated is directly proportional to the amplitude of and varies at the same rate of change as the output signal of the amplifier. Because of this direct, linear relationship between the rate of change of output signal and control voltage amplitude the stability and, to a larger degree, the sensitivity of such an automatic control arrangement is severely limited. That is, since the control voltage does not change at a rate that is faster than output amplitude changes, the control voltage can not effect amplitude corrections at a faster rate, thereby limiting the degree of correction and, consequently, restricting the overall stability of the control system.

The primary object of the invention is to improve the regulating characteristics of an automatic control system.

Another object of the invention is to provide for an automatic control system with improved sensitivity.

A further object of the invention is to improve the stability of an automatic control system.

*Summary of the invention*

To fulfill these objects, the invention incorporates into the feedback path of an automatic control circuit a bistable voltage comparator, which in combination with a subsequent filter network generates the required control voltage. Instead of just being linearly proportional to output amplitude variations, however, as is the case in conventional automatic control systems, the control voltage of the present invention is much more effective because of the much greater rate of change of the control voltage for a respective change in signal amplitude as a result of the inclusion of the bistable voltage comparator in the feedback path, thereby improving the sensitivity and the stability of the automatic control system.

In accordance with one feature of the invention the combination of the filter network and the bistable voltage comparator is incorporated into the feedback path of an automatic gain control system to automatically vary the loss characteristics of a variable loss device which is connected in the input of an amplifier to control and stabilize the amplitude of the output signal of the automatic gain control system.

In accordance with another feature of the invention, which is particularly useful in applications where the input signal consists of bursts of signals, an active filter network is utilized in combination with the bistable voltage comparator. The active filter provides for the automatic gain control voltage when the input signal is present, but maintains the automatic gain control voltage at a constant level between signal bursts.

More specifically, in one embodiment of the invention in an automatic gain control system a Schmitt trigger operates as the bistable voltage comparator and a standard integrating circuit serves as the filter network to produce the gain control voltage. A sinusoidal input signal of varying amplitude is applied to a variable loss device which varies and stabilizes the amplitude of the input signal in response to the automatic gain control voltage. The output of the variable loss device, in turn, is fed through an amplifier to be applied in one instance as the output signal to a load and, in addition, is used to produce the automatic gain control voltage by being processed through a full-wave rectifier. The full-wave rectified signal, in turn, is applied to the Schmitt trigger to generate a square-wave output voltage that has an average value which is proportional to the amplitude of the output signal of the amplifier. The square-wave output of the Schmitt trigger is next filtered to be applied as the gain control voltage to the variable loss device to automatically control and regulate the amplitude of the sinusoidal input signal. It is therefore possible as a result of the automatic, substantially instantaneous reaction of the feedback system in cooperation with the variable loss device and amplifier to maintain the amplitude of the output signal at a constant level, irrespective of the variations in input signal amplitude.

*Detailed description*

Figure 1:
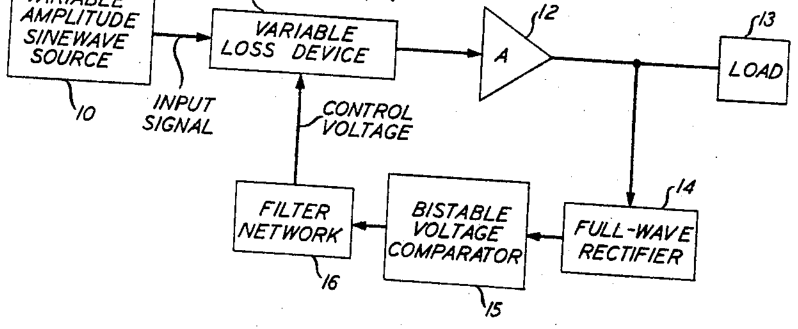
FIG. 1 is a block diagram of an embodiment of the invention incorporating a bistable voltage comparator in the control loop.

In FIG. 1 an automatic gain control system is shown comprising a source 10 supplying a sinusoidal signal of varying amplitude through variable loss device 11 and amplifier 12 to a load 13. Full-wave rectifier 14, together with bistable voltage comparator 15 and filter network 16, operates to generate the automatic gain control voltage that is used to stabilize the amplitude of the signal which is applied to load 13. The automatic gain control system functions to produce a stabilized, fixed amplitude output for load 13, irrespective of variations in either the input signal amplitude or other circuit parameters.

In the operation of the automatic gain control system, source 10 supplies a sinusoidal output signal of varying amplitude to the signal input of variable loss device 11. Variable loss device 11, in turn, controls the amplitude of its output signal as a function of a gain control voltage which is applied to its gain control input from filter network 16, where the filter network is a part of a feedback control path which in addition includes bistable voltage comparator 15 and full-wave rectifier 14. Variable loss device 11 may be a variolosser of the type illustrated in FIG. 4A of U.S. Patent 2,932,694, which issued to V. J. Hawks et al. on Apr. 4, 1960. Variable loss device 11 changes its loss characteristics in response to the gain control voltage, thereby controlling the amplitude of the signal processed through the variable loss device. The signal output of variable loss device 11, in turn, is amplified in amplifier 12 to be applied to load 13 as the system output. The output of amplifier 12, however, is also applied to full-wave rectifier 14 to provide for the gain vontrol voltage for the system.

From the operation of the system illustrated in FIG. 1 it is evident that the output signal of amplifier 12 provides a measure of the effectiveness of the gain control effected in the system. In order to provide for the proper gain control of the system, a portion of the output of amplifier 12 is therefore rectified in full-wave rectifier 14 to be applied to bistable voltage comparator 15. Bistable voltage comparator 15 may be a cathode-coupled or emitter-coupled binary circuit, or Schmitt trigger, as generally described in Section 10–11 of Millman and Taub, Pulse, Digital, and Switching Waveforms, McGraw-Hill, 1965. Bistable voltage comparator 15 switches to one of its stable output states whenever the applied input voltage crosses a predetermined threshold in one direction, and switches to its other stable output state whenever the applied input voltage crosses the threshold in the opposite direction. As the full-wave rectified sine wave is applied to the input of bistable voltage comparator 15, the bistable voltage comparator switches from one stable state to another stable state whenever the input waveform crosses the threshold level, thereby generating a square wave at the output of bistable voltage comparator 15.

The square-wave output of bistable voltage comparator 15 is next applied to low pass filter network 16 to produce a direct current gain control voltage that is directly proportional to the average value of the square wave. The output of filter network 16 is then used to control the loss of the variable loss device 11 to produce an amplitude stabilized output signal.

The effectiveness of the present invention in providing for the improved operating characteristics of the automatic gain control system can be more fully realized by examining the operation of bistable voltage comparator 15 in response to a periodic input signal, such as a full-wave rectified sine wave, where the input signal has a varying amplitude and where a Schmitt trigger is used as the bistable voltage comparator. The Schmitt trigger switches from one to the other of its stable output states whenever the input signal crosses a predetermined threshold level, thereby generating a square-wave output voltage. The duration of the pulses of the square-wave output voltage, however, is determined by the time/amplitude relationship of the input to the Schmitt trigger. That is, the Schmitt trigger switches to one stable state when the input crosses the threshold in one direction and it switches to the opposite stable state when the input crosses the threshold in the opposite direction. This complete two-way switching action repeats itself during each half-cycle of the rectified sine-wave input. As the amplitude of the sine wave changes, however, the slope of the leading and lagging edges of the waveform for each half-cycle change, too. As a result, the input waveform reaches the threshold level amplitude at different times within the respective half-cycles. Consequently, the Schmitt trigger switches states at different times depending upon the amplitude of the input signal, thereby varying the duty cycle of its output waveform. It is readily apparent that by properly selecting the threshold level of the Schmitt trigger the response of the Schmitt trigger can be so adjusted that small amplitude changes in input signal will cause sudden, large changes in the duty cycle of the Schmitt trigger square-wave output. The large change in gain control voltage that necessarily results automatically changes the loss in the variable loss device to adjust the overall system gain, thereby maintaining the amplitude of the output signal at the desired level.

It is therefore evident from the operation of the gain control system illustrated in FIG. 1 that the feedback control network comprising full-wave rectifier 14, bistable voltage comparator 15, and filter network 16 produces a gain control voltage that automatically controls the loss characteristics of variable loss device 11 to stabilize and control the amplitude of the output signal of the overall system.

Figure 2:
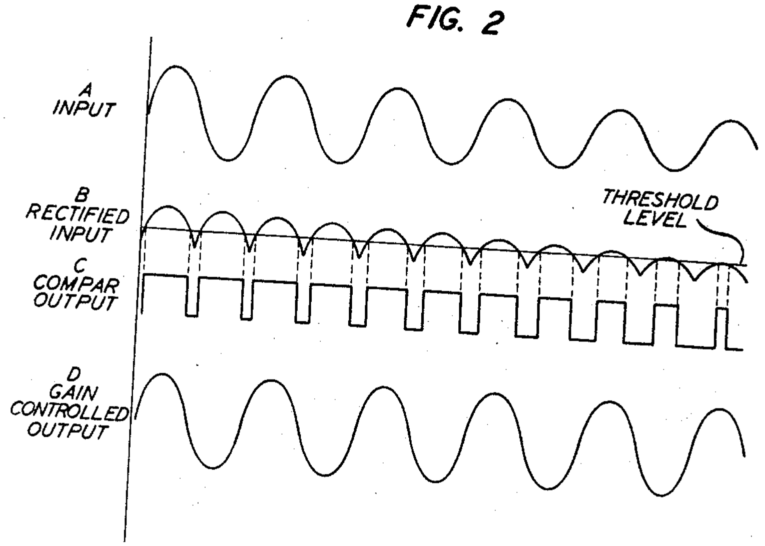
FIG. 2, lines A through D, illustrates the operation of the embodiment of FIG. 1.

FIG. 2, in lines A through D, shows typical waveforms which illustrate the operation of the automatic gain control system of FIG. 1. Line A of FIG. 2 shows an input signal which has a varying amplitude. This input signal is applied to variable loss device 11 to be operated on by the automatic gain control voltage derived from filter network 16. The output of variable loss device 11 is then amplified by amplifier 12 to be applied as an output signal to load 13. The output of amplifier 12 is also applied to a full-wave rectifier 14 to provide for the automatic gain control voltage. The full-wave rectified output of rectifier 14 is next applied to bistable voltage comparator 15. In the operation of the automatic gain control system, any output voltage amplitude changes are immediately sensed and are automatically and substantially instantaneously corrected. As a result, the amplitude of the system output signal as shown in line D of FIG. 2 remains substantially constant, thereby also maintaining the duty cycle of the Schmitt trigger constant. In order to illustrate the corrective action of the feedback loop through the operation of bistable voltage comparator 15 more clearly, however, a rectified input that has a decreasing amplitude together with a fixed threshold level is shown in line B of FIG. 2.

The predetermined threshold level, in conjunction with the output from rectifier 14, determines the switching operation of the comparator. That is, as the increasing voltage of each half-cycle of the full-wave rectified sine wave crosses the threshold level, the bistable voltage comparator output switches to its high level output state. As the decreasing voltage of each half-cycle crosses the threshold, on the other hand, the bistable voltage comparator output switches to its low level output state. For each half-cycle of the sine wave the bistable voltage comparator switches its output state twice, thereby generating a square wave as shown in line C of FIG. 2. The durations of the specific square-wave periods, however, are a function of the amplitude of the input signal to the voltage comparator as compared to the threshold level. The variation in the duty cycle of the square wave as a function of the input signal amplitude and a specific threshold level is illustrated in lines B and C of FIG. 2. As shown, the duration of the square-wave cycles is determined by the crossover points of the input signal with the threshold level. The change in the duration of the specific square-wave cycle as a function of input signal amplitude is readily apparent from lines B and C of FIG. 2.

The drastic change in the square-wave duration for small changes in input signal amplitude is particularly emphasized in the region where the input signal amplitude approaches the threshold level. This large change in square-wave duration for small changes in input signal amplitude contributes to a large degree to the effectiveness and sensitivity of the embodiment of the invention.

The output of bistable voltage comparator 15, in turn, is applied to filter network 16, which effectively integrates the squave-wave output of bistable voltage comparator 15 to convert the square wave into a D.C. voltage having an average value proportional to the duty cycle of the square wave. The direct current gain control voltage output from filter network 16 is finally applied to the gain control input of variable loss device 11 to control the amplitude of the input signal to the gain control system. The gain controlled output of the automatic gain control system is shown in line D of FIG. 2. The output is stabilized to a constant level despite the severe input amplitude variations as shown in line A of FIG. 2.

Figure 3:
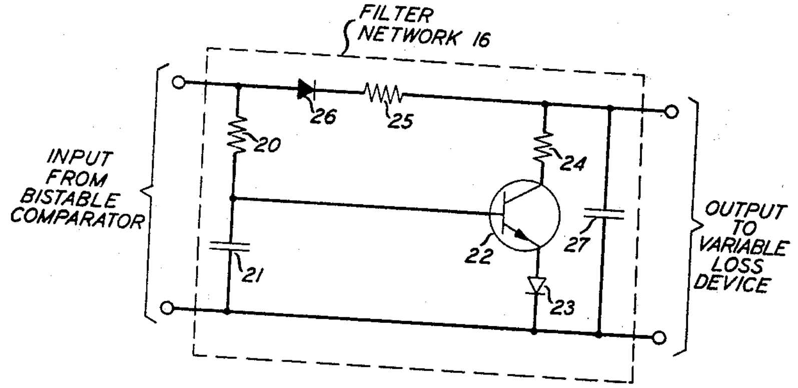
FIG. 3 is a schematic diagram of one specific filter network that may be incorporated in the embodiment of FIG. 1.

Depending upon the particular application of the automatic gain control system of FIG. 1, filter network 16 may for instance be a standard integrating network or may take the form of the active network shown in FIG. 3. In the filter network shown in FIG. 3 the square-wave output from bistable voltage comparator 15 is applied to the input terminals of the filter of FIG. 3 across an integrating network consisting of the series combination of resistor 20 and capacitor 21. The junction of resistor 20 and capacitor 21 is connected to the base electrode of transistor 23, while the emitter electrode of transistor 23 is connected to the anode of diode 23 which has its cathode connected to the junction point of capacitor 21 and one of the input terminals. The collector electrode of transistor 22, on the other hand, is connected through the series combination of resistors 24 and 25, respectively, to the cathode of diode 26, which has its anode connected to the junction of resistor 20 and another of the input terminals. Capacitor 27, in turn, is connected across the output terminals of the filter network in parallel with the series combination of resistor 24, the collector-emitter path of transistor 22, and diode 23.

In the operation of filter network 16 of FIG. 3 the square-wave output from bistable voltage comparator 15 is applied to the input terminals. The time constant of the integrating network which is connected across the input and which consists of resistor 20 and capacitor 21 is such that the applied square wave generates sufficient voltage across capacitor 21 to forward bias transistor 22. Consequently, transistor 22 is rendered conductive as a result of which its emitter-collector path impedance is effectively reduced to zero. Capacitor 27 is therefore effectively bypassed by the series combination of resistor 24 and the forward biased impedance of diode 23 during the conduction of transistor 22.

The square-wave input signal that is applied to the input terminals of the filter network shown in FIG. 3 is also applied through diode 26 and resistor 25 across the parallel combination of capacitor 27 and resistor 24 with diode 23. During the application of the input signal a voltage is therefore developed across capacitor 27 which is representative of the average value of the square-wave input signal. This voltage that is developed across capacitor 27 is then utilized as the gain control voltage to control the loss of the variable loss device 11 to stabilize the gain of the automatic gain control system.

The filter network of FIG. 3 is particularly advantageous in an application where the input signal consists, for instance, of brusts of sinusoidal signals, with the input signal being reduced to less than the required threshold level between signal bursts. In an application where the input signal consists of such signal bursts, the bistable voltage comparator puts out a square wave only during the presence of input signal bursts. As a result, transistor 22 loses its forward bias as soon as a respective signal burst ceases. Transistor 22 therefore ceases conduction at the end of each signal burst, thereby causing its emitter-collector path to present a very high impedance in series with resistor 24. In addition, diode 26 becomes back-biased at this time, thereby preventing capacitor 27 from discharging back into the input circuit. As a result capacitor 27 maintains its charge even between input signal bursts since it can discharge neither through nonconducting transistor 22 nor back into the input through diode 26 which blocks that discharge path.

The gain control voltage level is thereby held fixed until another burst of input signal forward biases transistor 22 again to establish a new gain control voltage level that corresponds to the new input signal. Filter network 16 functions, therefore, as a gain control voltage memory device, which prevents the sudden undesired gain changes that would otherwise occur whenever the input signal level suddenly decreases below the threshold level.

It is to be understood that the embodiment described herein is illustrative of the application of the principles of the invention. Numerous other arrangements may be devised by those skilled in the art without departing from the spirit and scope of the invention.

I claim:

1. An automatic control circuit which comprises means for supplying a periodic input signal having a varying amplitude, said input signal having finite and predetermined rise and fall times, whereby the slope of the leading edge and of the lagging edge of said input signal changes in proportion to a change in input signal amplitude, a rectifier, a bistable voltage comparator having a predetermined input threshold, said voltage comparator switching to one stable state whenever an applied voltage crosses said threshold in one direction and switching to the other stable state whenever an applied voltage crosses said threshold in an opposite direction, said input signal being applied to said rectifier, the output of said rectifier being applied to the input of said voltage comparator, said rectifier output switching said voltage comparator from one of said stable states to another of said stable states whenever said rectifier output crosses said threshold, thereby generating at the output of said voltage comparator a square-wave output voltage the duty cycle of which is determined by the amplitude of the rectifier output of said voltage comparator to generate a control voltage representative of the amplitude level of said input signal.

2. The automatic control circuit in accordance with claim 1 in which said means for supplying said periodic input signal comprises a source of sinusoidal signals, a variable loss device having a signal input and control voltage input, and an amplifier, the output of said input means being supplied to the signal input of said variable loss device, the output of said variable loss device being connected to the input of said amplifier, the output of said amplifier being connected to the input of said rectifier, and the output of said filter being connected to the control voltage input of said variable loss device, whereby a control voltage is generated in response to the amplitude of the output signal of said amplifier to stabilize the amplitude of the output of said amplifier.

3. The automatic control circuit in accordance with claim 2 in which said filter means comprises a capacitor and a resistor serially connected across the input of said filter, and in which the voltage across said capacitor is utilized as the control voltage.

4. The automatic control circuit in accordance with claim 2 in which said input signal means produces bursts of sinusoidal signals and in which said filter means comprises first, second, and third resistors, first and second capacitors, first and second diodes, and a transistor having a base electrode, a collector electrode, and an emitter electrode, said first resistor and said first capacitor being serially connected across the input of said filter, the junction point of said first resistor and said first capacitor being connected to the base electrode of said transistor, said first diode having its anode connected to the emitter electrode of said transistor and its cathode connected to another terminal of said first capacitor, said second diode having its anode connected to another terminal of said first resistor, said second and third resistors being serially connected between the cathode of said second diode and the collector electrode of said transistor, said second capacitor being connected between the junction point of said second and third resistors and the junction point of said first capacitor and the cathode of said first diode, said input from said bistable voltage comparator forward biasing said transistor to produce an output voltage across said second capacitor that is proportional to the average value of said input, said transistor ceasing conduction whenever said input signal ceases, thereby holding the automatic control voltage across said second capacitor approximately constant between signal bursts.

5. An active filter which comprises input and output terminals, means for supplying an input signal to said input terminals, first, second, and third resistors, first and second capacitors, first and second diodes, and a transistor having a base electrode, a collector electrode, and an emitter electrode, said first resistor and said first capacitor being serially connected across the input of said filter, the junction point of said first resistor and said first capacitor being connected to the base electrode of said transistor, said first diode having its anode connected to the emitter electrode of said transistor and its cathode connected to another terminal of said first capacitor, said second diode having its anode connected to another terminal of said first resistor, said second and third resistors being serially connected between the cathode of said second diode and the collector electrode of said transistor, said second capacitor having one terminal connected to one output terminal and to the junction point of said second and third resistors and having another terminal connected to another output terminal and to the junction point of said first capacitor and the cathode of said first diode, whereby said input signal forward biases said transistor to produce across said second capacitor an output voltage which is proportional to the average value of said input.

6. The active filter in accordance with claim 5 in which said input signal means produces bursts of input signals, whereby said transistor is forward biased during the duration of said respective signal burst to produce across said second capacitor an output voltage which is proportional to the average value of said input, said transistor ceasing conduction whenever said input signal ceases, thereby maintaining the output voltage across said second capacitor substantially constant between bursts of input signal.

References Cited

UNITED STATES PATENTS

| | | | |
|---|---|---|---|
| 3,021,489 | 2/1962 | Nielsen | 330—29 |
| 3,360,748 | 12/1967 | Fish et al. | 330—52 X |

ROY LAKE, *Primary Examiner.*

JAMES B. MULLINS, *Assistant Examiner.*